United States Patent

McGee

[15] 3,688,742
[45] Sept. 5, 1972

[54] TOILET TRAINING ASSEMBLY FOR CATS

[72] Inventor: Michael H. McGee, 1930 Harbor Ave., Long Beach, Calif. 90810

[22] Filed: Sept. 18, 1970

[21] Appl. No.: 73,541

[52] U.S. Cl. .............................................. 119/1, 4/6
[51] Int. Cl. .............................................. A01k 67/00
[58] Field of Search ................................. 119/1; 4/6

[56] References Cited

UNITED STATES PATENTS

| | | |
|---|---|---|
| 2,053,594 | 9/1936 | Albert ........................... 119/1 |
| 2,251,039 | 7/1941 | Da Silva ........................... 4/6 |
| 2,306,014 | 12/1942 | Carson ........................... 119/1 |
| 2,584,656 | 2/1952 | Anderson ........................ 119/1 |
| 2,741,223 | 4/1956 | Winborn, Jr. .................... 119/1 |

Primary Examiner—Aldrich F. Medbery
Attorney—William C. Babcock

[57] ABSTRACT

An assembly for training a cat to use a toilet commode bowl after the cat has been trained to use a sand box for toilet purposes, and a support for a cat so using a toilet bowl.

2 Claims, 7 Drawing Figures

PATENTED SEP 5 1972 3,688,742

INVENTOR.
MICHAEL H. MCGEE
BY
William G. Babcock
ATTORNEY

TOILET TRAINING ASSEMBLY FOR CATS

BACKGROUND OF THE INVENTION

1. Field of the Invention

A toilet training assembly for cats.

2. Description of the Prior Art

In the past, it has been common practice for owners of cats and kittens to place a sand or litter box in the house that may be used by the animal for toilet purposes. However, this procedure has the disadvantage that the sand or litter must be changed every few days, as well as the objectionable odors that arise from such a box.

The primary purpose of the invention is to provide a device that may be removably placed on a toilet commode to allow a cat to use the same for toilet purposes, after the cat has been trained to use a conventional litter box.

The present invention has the advantage that when used the owner of the pet need no longer maintain a sand or litter box, but instead removably places the invention on the bowl of a toilet, to permit the cat to use the same for toilet purposes.

SUMMARY OF THE INVENTION

An assembly of elements for training a cat to use a toilet commode bowl for toilet purposes, after the cat has been trained to use a sand or litter box for the same purpose. The device not only serves the above described training purposes, but also a portion of the assembly actually provides the support for the cat on a toilet commode bowl.

A major object of the present invention is to provide an assembly of elements to train a cat to use a toilet commode bowl for toilet purposes after the cat has been trained to use a litter box, and one portion of the assembly capable of being removably mounted on the toilet bowl to support the cat.

Another object of the invention is to supply a training device for cats that permits the animals to remain in a building or residence without the necessity of maintaining a sand or litter box therein.

Yet another object of the invention is to supply a cat training device that has an extremely simple mechanical structure; can be fabricated from standard, commercially available materials; is simple and easy to use; may be removably mounted on the bowl of a toilet bowl for use by a cat, and can be retailed at a sufficiently low price as to encourage the widespread use thereof by owners of cats.

DESCRIPTION OF THE PREFERRED EMBODIMENT

Figure 1:
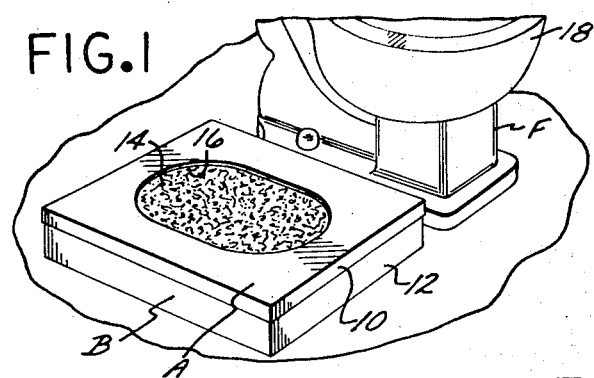
FIG. 1 is a perspective view of a conventional toilet commode with a conventional sand or litter box situated adjacent thereto, which litter box has a first flanged cover removably mounted thereon, and the first cover having a generally oval-shaped first opening therein.

The cat training and cat toilet providing assembly is shown in perspective in FIGS. 1 to 5, inclusive. The assembly includes a first rectangualr cover A that has flanges 10 extending downwardly from the outer edges thereof, which flanges snuggly and slidably engage the wall 12 of a conventional litter box B. The box B is filled with sand or litter 14. The first cover A has an opening 16 therein of such size that the litter 14 is clearly visible to a cat, and to the extent that the animal will be encouraged to use the litter for toilet purposes. During the training of a cat with the present assembly, it is desirable that the litter box B be placed adjacent a toilet commode F that has a bowl 18.

The opening 16 in FIG. 1 is important. The opening is of a size to just allow the cat to directly use the cat litter. The idea is to make the cat feel slightly restricted so he gets used to relieving himself in a cramped space.

Figure 2:
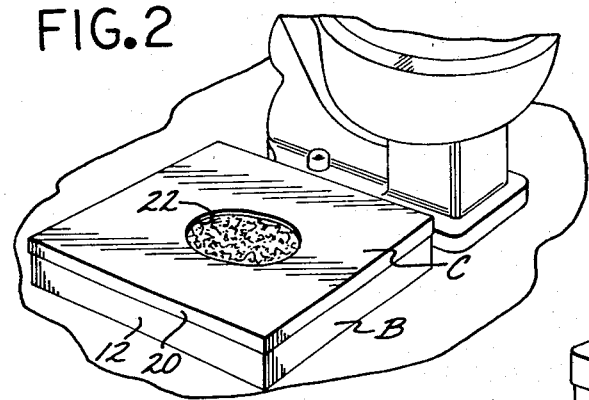
FIG. 2 is the same perspective view as shown in FIG. 1, but with the sand or litter box having a second flanged cover removably mounted thereon that has a second opening therein of smaller transverse cross section then said first opening.

After a cat has been trained to use the litter box B for toilet purposes, with the first cover A in place thereon, a second cover C as shown in FIG. 2 is used on the litter box B in lieu of the first cover A. The second cover C has flanges 20 extending downwardly from the edges thereof that snuggly and slidably engage the sides 12 of the litter box B. The second cover C has a second opening 22 therein that is of oval shape, and substantially smaller than the first opening 16. A cat having learned to use the litter box B will have no difficulty in following this training when the box has the second cover C thereon in which the second opening 22 of smaller cross section is formed.

Figure 3:
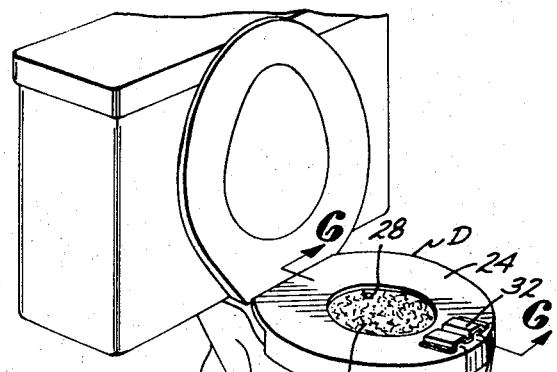
FIG. 3 is a perspective view of a conventional toilet, having a third oval-shaped cover removably supported on the upper part of the bowl portion thereof, which third cover has a third oval-shaped opening therein that is in communication with a sand or litter holding receptable situated thereunder.
Figure 6:
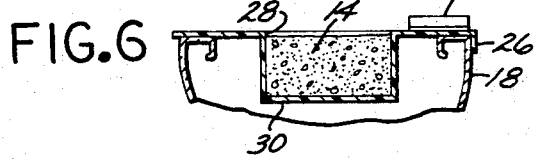
FIG. 6 is a longitudinal cross sectional view of the third form of cover, taken on the line 6—6 of FIG. 3.

A third cover D is shown in FIG. 3 that is of oval shape, and includes an upper supporting plate 24 that has a horseshoe shaped flange 26 depending from all but the rearward outer edge portion thereof. The flange 26 is of such size as to removably engage the upper exterior portion of the bowl 18 as shown in FIG. 6 to removably maintain the third cover D in a fixed position thereon. The third cover D has a third oval-shaped opening 28 therein that is the same size as the second opening 22. The size of opening 22 in FIG. 2 is also important. The opening is of such a size so that it's small enough to keep the cat from directly using the cat litter;

that is, he must perch himself over the edge of the hole. The hole is still large enough so the cat can dig around in the litter.

The plate 24 has a receptacle 30 as may be seen in FIG. 6 depending from the center thereof that is in communication with the third opening 28. Receptacle 30 is filled with sand or litter 14. A cat trained to use the sand box B containing litter 14, will associate the litter 14 in receptacle 30 with the sand box, and will use the third cover D in the same manner that the cat used the first and second covers A and C respectively for toilet purposes.

Figure 5:
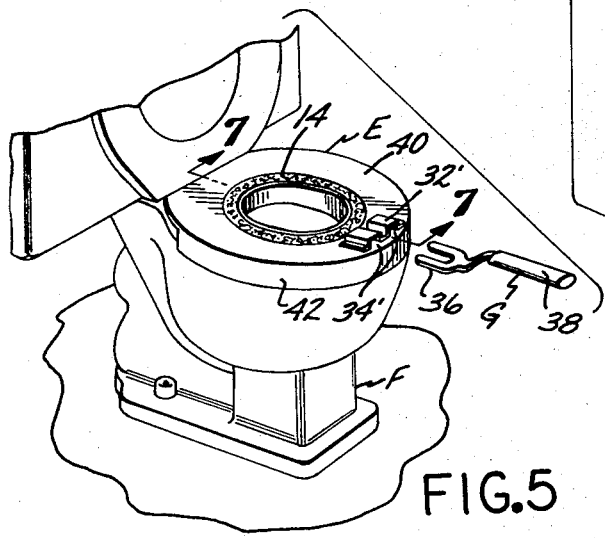
FIG. 5 is the same view as shown in FIG. 4, but illustrating the manner in which a bifurcated instrument may be used to removably engage spaced passage defining means on the fourth cover to remove said cover from a toilet bowl or place said cover thereon.

The third cover D has two laterally spaced, channel-shaped members 32 secured to the upper forward portion of the supporting plate 24, and these channel-shaped members cooperating with the plate to define two passages 34 as shown in FIG. 3. A handling instrument G is shown in FIG. 5, that has a bifurcated forward portion 36 that may removably engage the passages 34, to place the third cover D on the bowl 18 or remove the third cover D therefrom. The instrument G also includes a handle 38 that is secured to the bifurcated portion 36 as shown in FIG. 5 by conventional means.

Figure 4:
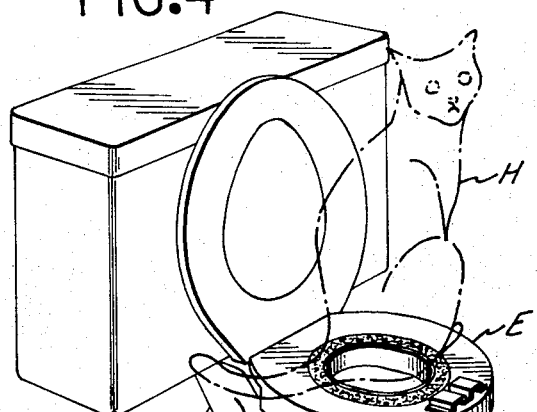
FIG. 4 is a perspective view of a conventional toilet on which a fourth cover is removably mounted that has a fourth oval-shaped opening therein that is in communication with the interior of the toilet bowl, and the fourth cover of such size that a cat shown in phantom line may sit thereon.

After a cat has been trained to use the third cover D for toilet purposes, the third cover is no longer used, and a fourth cover E as shown in FIGS. 5 and 6 is provided to replace the third cover. The fourth cover E includes an oval-shaped supporting plate 40 that has a horseshoe-shaped flange depending therefrom, which flange removably engages the upper exterior portion 18a of bowl 18, to support the fourth cover E in position thereon as shown in FIGS. 4 and 5. Fourth cover E has a fourth opening 46 defined therein, which fourth opening is in communication with the interior 49 of bowl 18.

Figure 7:
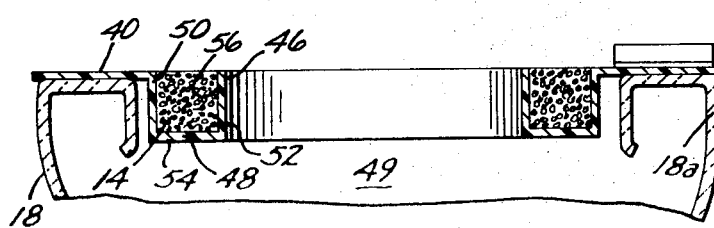
FIG. 7 is a longitudinal cross sectional view of the fourth form of cover, taken on the line 7—7 of FIG. 5.

The fourth opening 46 is defined by the interior of a channel-shaped member 48. Member 48 includes first and second legs 50 and 52 as shown in FIG. 7 which on their lower ends are connected by a web 54. The legs 50 and 52, together with the web 54 define an oval-shaped space 56 that is filled with sand or litter 14. The support plate 40 also has two transversely spaced, channel-shaped members 32' secured to the upper forward portion thereof that cooperate with the plate to define two passages 34'. When the passages 34' are engaged by the bifurcated portion 36 of the instrument G, the fourth cover can be raised from or deposited on the upper portion of the bowl 18 in the same manner as the third cover D. The sand or litter 14 is clearly visible to the cat H shown in phantom line in FIG. 4. When the fourth cover E is used, and the cat having been trained to associate the litter 14 with the litter box B and the third cover D, the cat will thereafter associate the fourth cover E with toilet purposes, and will use the same in the manner shown in FIG. 4. After the cat has been trained to use one of the assemblies previously described, the assembly that the cat has previously used is stored in a location not visible to the cat, as otherwise the cat will not progress satisfactorily through the training program and learn to use the fourth cover E as shown in FIG. 4.

The opening 46 and litter ring in FIG. 4 are of a size narrow enough so that the cat is forced to again perch over the edge of a ring—but this time into the toilet. The litter ring is just wide enough so that the cat can dig around if he wants to; however, it must have a sufficient inside diameter so that the cat misses it when he relieves himself in the toilet.

I claim:

1. A support for a cat that may be removably mounted on the bowl of a toilet commode which includes:

a. a cover of generally oval shape that has a slightly larger transverse cross section than that of the bowl on which it is to be mounted, said cover having an opening formed at substantially the center thereof;

b. an endless inverted channel-shaped member of generally oval shape that can be filled with litter, said member being disposed below said opening in said cover and extending inwardly therefrom, said member secured to said cover, and said channel-shaped member defining a downwardly extending opening that is in communication with the interior of said bowl when said cover rests on the open edge portion thereof; and c. means for removably securing said cover in a fixed position on said upper edge portion of said bowl to serve as a support for a cat when said cover is mounted on said bowl.

2. A support as defined in claim 1 in which said means is a flange that extends downwardly from said cover and removably engages the upper exterior portion of said bowl.

* * * * *